Patented June 27, 1950

2,512,629

UNITED STATES PATENT OFFICE 2,512,629

POLY-4-AMINO-TRIAZOLE COMPOSITIONS

James Wotherspoon Fisher, Edward William Wheatley, and Harold Bates, Spondon, near Derby, England, assignors to Celanese Corporation of America, a corporation of Delaware No Drawing. Application November 5, 1947, Serial No. 784,307. In Great Britain May 10, 1945

3 Claims. (Cl. 260—13)

This invention relates to improvements in polymer compositions.

This application is a continuation-in-part of U. S. application S. No. 662,628, filed April 16, 1946.

It is well known that a number of fibre-forming or film-forming polymers, for example cellulose acetate, cellulose aceto-butyrate, cellulose butyrate, cellulose aceto-stearate, ethyl cellulose, oxyethyl cellulose, oxyethyl cellulose acetate, benzyl cellulose and various other cellulose derivatives, and such vinyl polymers as polyvinyl chloride-acetate, have little or no affinity for acid wool colours but have a good affinity for the dispersed insoluble type of dye stuff now generally applied to cellulose acetate. Furthermore, polyamides, for example those derived from diamines and dicarboxylic acids, e. g. the so-called 66-nylon derived from hexamethylene diamine and adipic acid, have insufficient affinity for the acid wool colours for most purposes. They too have a good affinity for the dispersed insoluble type of dyestuff.

U. S. Application S. No. 609,031 filed August 4, 1945 describes the production of nitrogen-containing polymers from dihydrazides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. application S. No. 662,628 filed April 16, 1946 describes the production of such polymers from hydrazine and the dicarboxylic acids themselves or their anhydrides, again using more than two moles of hydrazine. Further, U. S. application S. No. 662,628 describes the production of nitrogen-containing polymers from mixtures of diamides and dihydrazides of dicarboxylic acids with free hydrazine, from dicarboxylic acids, esters or anhydrides with ammonia and hydrazine using more than two moles of total base including more than one mole of hydrazine, from dinitriles of dicarboxylic acids with hydrazine, and from various other combinations of raw materials. Polymers may be produced according to the processes of the specifications which possess characteristics, including resistance to degenerative hydrolysis by boiling hydrochloric acid, indicating that they contain the 1.2.4-triazole nucleus repeated along the main polymer chain. As pointed out in said specifications, the polymers may be obtained by heating a reaction mixture which on complete hydrolysis contains a mixture of a dicarboxylic acid free from reactive groups other than the carboxy groups and hydrazine, there being sufficiently more than two moles of hydrazine for each mole of dicarboxylic acid to produce a polymer resistant to hydrolysis by boiling hydrochloric acid.

Particularly valuable polymers are those of high melting point and high nitrogen content approximating to the theoretical nitrogen content for a polymer containing the 4-amino-1.2.4-triazole nucleus repeated at intervals along the polymer chain and linked together by the links derived from the dicarboxylic acid or derivative used as starting material. These polymers of high melting point and high nitrogen content which are resistant to hydrolysis by hydrochloric acid will be referred to in the present specification as poly-4-amino-1.2.4-triazoles. It was found that these polymers exhibited a very good affinity for acid wool colours as well as for the dispersed insoluble type of dyestuff generally applied to cellulose acetate.

In accordance with the present invention, compositions for the purpose of filament formation, film formation or the like are made up of a filament- or fibre-forming material, for example cellulose acetate or other of the cellulose derivatives mentioned above, which has little or no affinity for acid wool colours, together with a poly-4-amino-1.2.4-triazole. Such compositions may be formed into filaments or films by any suitable method.

Such compositions exhibit a substantive affinity for acid wool colours which is either direct or is latent according to the method used in forming the compositions. Thus, if a solution containing both the poly-4-amino-1.2.4-triazole and the filament- or fibre-forming material having little or no affinity for wool colours is coagulated by means of a medium which has a very strong precipitating action, then usually the resulting composition can be dyed directly from an aqueous bath with an acid wool dyestuff. If such a solution, however, is dry spun by ordinary dry spinning methods to produce filaments or films, or is wet spun into a coagulating bath which has a relatively slow coagulating action upon the dissolved material, then the affinity of the composition for acid wool dyestuffs is masked or rendered latent, possibly by filming of the particles of poly-4-amino-1.2.4-triazole by means of the other polymer. This masked or latent affinity for acid wool dyes may, however, be brought out by treating the resulting filaments, films or other products with a swelling agent, with or without a previous treatment, in the case of saponifiable materials such as cellulose acetate, with dilute caustic soda or other mild saponifying agent.

Generally the poly-4-amino-1.2.4-triazoles are not soluble in the usual type of solvent used for dissolving such filament-forming materials as cellulose derivatives, for example acetone, acetone-alcohol, benzene-alcohol, ethyl acetate or the like. It is possible, however, to dissolve both the cellulose derivative and the poly-4-amino-1.2.4-triazole in a common solvent of the type described in co-pending application S. No. 662,627 filed April 16, 1946 and particularly with the mixed alcohol chlorinated hydrocarbons of that specification, for example methanol-chloroform, and solutions in such common solvents may be made up and formed directly into filaments, films or other products. An alternative procedure, however, enabling the ordinary solvents to be used for the filament or film formation, is to dissolve the cellulose derivative and the poly-4-amino-1.2.4-triazole in a common solvent such as acetic acid or formic acid which is not generally suitable for the production of filaments, films or the like, and to precipitate the solution containing the two polymers with a suitable precipitant, for example water, and then to dissolve the mixed composition in one of the usual dry spinning solvents, such as acetone. The poly-4-amino-1.2.4-triazoles are not soluble in acetone but nevertheless are sufficiently finely divided in a composition produced by such a process as to enable the solution in acetone to be spun into filaments or formed into films by the ordinary methods.

The affinity of the materials for acid wool dyes may be varied in accordance with the proportion of polyaminotriazole in the composition. Very suitable proportions for giving full shades with acid wool colours comprise 5-20% of polyaminotriazole to 95-80% of the filament-forming material which has little or no affinity for the wool colours. In the case of the polyamides, which do have a slight affinity for such colours, it is possible to bring these proportions down somewhat and still obtain full shades. Compositions containing polyamides and the polyaminotriazoles may be spun into filaments by melt spinning methods.

For the purpose of the present invention, it is not necessary that the polyaminotriazole used should have a sufficiently high molecular weight as to be filament-forming per se, though if a polymer of such high molecular weight is used it assists in maintaining the strength of the composition and particularly of filaments and films made therefrom. Generally the polyaminotriazoles become filament-forming when the intrinsic viscosity as measured in a 1% solution of the polymer in meta-cresol attains a value of 0.3-0.4. At an intrinsic viscosity of about 0.5, the filaments made from the polymer exhibit good cold-drawing properties. In the present invention, polymers may be used with intrinsic viscosities ranging from as low as 0.15 up to 0.5 or higher.

The following examples illustrate the invention.

*Example 1*

85 parts of acetone-soluble cellulose acetate flake (as customarily used for the production of filaments by dry spinning methods) and 15 parts by weight of a polyaminotriazole, intrinsic viscosity 0.65, made from sebacic dihydrazide and hydrazine hydrate according to U. S. application S. No. 609,031, were dissolved in cold acetic acid and the resulting solution poured into excess cold water. The material precipitated was a white fibrous mass which was thoroughly washed with water and dried in an oven at 110° C. The composition could readily be dyed with wool dyes, for example Napthalene Scarlet BS, from an aqueous solution at 80° C., the bath preferably containing a trace of acetic acid. The cellulose acetate flake alone was only slightly stained by the dyebath.

*Example 2*

80 parts by weight of the same cellulose acetate flake and 20 parts by weight of the same polyaminotriazole were dissolved in cold formic acid and reprecipitated by pouring into excess water, washed and dried. The product was a white, rather tough, semi-fibrous mass with a nitrogen content of 5%. It gave a very full shade on dyeing as described in Example 1.

A repeat of this example using 90 parts of cellulose acetate flake and 10 parts of polyaminotriazole also gave a composition showing good affinity for the wool colours, as did a composition made from 95 parts of cellulose acetate flake and 5 parts of polyaminotriazole, the shade showing increasing intensity with increasing content of polyaminotriazole. The cellulose acetate flake alone was only slightly stained by the dyebath.

*Example 3*

90 parts of the same cellulose acetate flake were dissolved in cold concentrated acetic acid and 10 parts of a poly-4-amino-1.2.4-triazole of intrinsic viscosity 0.20, also derived from sebacic dihydrazide and hydrazine hydrate, were dissolved in acetic acid and refluxed for ½ hour. The two solutions were then mixed to give a clear viscous dope. The dope was poured into a large excess of water, when the polymers precipitated as a white fibrous mass, which was thoroughly washed and dried in an oven at 110° C. The mixed polymers were ground to a fine powder and stirred into acetone so as to give a 27% solution. The material was then spun into filaments by ordinary dry spinning methods. They showed a nitrogen content of about 2.3% and had a melting point of about 250° C. Hanks made from the yarn so spun were entered into a dyebath made up from an acid wool dye and a mixture of 80 parts by weight of water with 20 parts by weight of methanol together with a trace of acetic acid. The hanks were treated in the liquid for ½ hour at 70° C., rinsed in cold water and scoured for 10 minutes in a 0.2% soap solution at 65-70° C., followed by a final rinse in luke-warm water. The hanks from the above composition were dyed in the above bath together with similar hanks made of yarn consisting of the same cellulose acetate alone. The dyestuffs examined were Kiton Yellow S, Carbolan Crimson BS and Naphthalene Scarlet BS. In each case the yarns made from the mixed composition were dyed a full shade while the cellulose acetate yarns were merely slightly stained.

*Example 4*

A solution was made up of 40 parts of the polyaminotriazole used in Example 1 and 160 parts of the cellulose acetate in 1000 parts of a mixed solvent consisting of 800 parts by volume of methanol and 200 parts by volume of chloroform. The solution was effected by refluxing and when solution was complete the dope was filtered and then spread on glass plates to give films. These films were clear and slightly elastic and, when subjected to the dyeing treatment described in the preceding example, gave full shades.

*Example 5*

Hanks of acetone-soluble cellulose acetate yarn and of the yarn produced according to Example 3 were immersed for 2 minutes in a 1% aqueous solution of caustic soda at 50° C. and then thoroughly rinsed in cold water. They were then dyed with Kiton Yellow S according to the technique described in Example 3. The yarn containing the mixed polymers retained a deep yellow shade, whereas the cellulose acetate yarn was merely stained a very light peach colour.

*Example 6*

A polyamide was produced by melt polymerisation of adipic acid and hexamethylene diamine, using hexamethylene diamine as viscosity stabiliser, to give a polymer of intrinsic viscosity 0.80. 90 parts of this polymer were dissolved in cold formic acid and separately 10 parts of the poly-aminotriazole used in Example 1 were dissolved in cold formic acid, the two solutions mixed and poured into excess cold water. The fibrous material was then thoroughly dried in an oven at 110° C. and melt spun according to the ordinary melt spinning technique. Hanks of the resulting yarn were dyed in an aqueous dyebath at 80° C. made up with Kiton Yellow S and a trace of acetic acid. A good deep shade was obtained, whereas filaments made from the same polyamide alone achieved only a very weak shade except when the dyebath was made strongly acid.

Having described our invention, what we desire to secure by Letters Patent is:

1. A composition comprising a film-forming organic substitution derivative of cellulose having substantially no affinity for acid wool colors and a poly-4-amino-1.2.4-triazole obtained by heating a reaction mixture which on complete hydrolysis contains a mixture of a dicarboxylic acid free from reactive groups other than the carboxy groups and hydrazine, there being sufficiently more than two moles of hydrazine for each mole of dicarboxylic acid to produce a polymer resistant to hydrolysis by boiling hydrochloric acid.

2. A composition comprising acetone-soluble cellulose acetate and a poly-4-amino-1.2.4-triazole resistant to degradation by boiling hydrochloric acid and obtained by heating a reaction mixture which on complete hydrolysis contains a mixture of a dicarboxylic acid free from reactive groups other than the carboxy groups and hydrazine, there being sufficiently more than two moles of hydrazine for each mole of dicarboxylic acid to produce a polymer resistant to hydrolysis by boiling hydrochloric acid.

3. A composition comprising acetone-soluble cellulose acetate and polyoctamethylene-4-amino-1.2.4-triazole obtained by heating sebacic dihydrazide with sufficient hydrazine to produce a polymer resistant to hydrolysis by boiling hydrochloric acid.

JAMES WOTHERSPOON FISHER.
EDWARD WILLIAM WHEATLEY.
HAROLD BATES.

REFERENCES CITED

The following references are of record in the file of this patent:

UNITED STATES PATENTS

| Number | Name | Date |
| --- | --- | --- |
| 2,395,642 | Prichard | Feb. 26, 1946 |